United States Patent
Noumi et al.

(10) Patent No.: US 9,142,818 B2
(45) Date of Patent: Sep. 22, 2015

(54) BATTERY SEPARATOR AND BATTERY USING THE SAME

(75) Inventors: Shunsuke Noumi, Osaka (JP); Hiroyoshi Take, Osaka (JP); Kinkou Sho, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 698 days.

(21) Appl. No.: 12/935,735

(22) PCT Filed: Mar. 31, 2009

(86) PCT No.: PCT/JP2009/056720
§ 371 (c)(1),
(2), (4) Date: Feb. 17, 2011

(87) PCT Pub. No.: WO2009/123218
PCT Pub. Date: Oct. 8, 2009

(65) Prior Publication Data
US 2011/0135989 A1    Jun. 9, 2011

(30) Foreign Application Priority Data

Mar. 31, 2008 (JP) ................................ 2008-094392

(51) Int. Cl.
| | | |
|---|---|---|
| *H01M 2/16* | (2006.01) | |
| *H01M 10/052* | (2010.01) | |
| *H01M 10/0565* | (2010.01) | |
| *H01M 10/0525* | (2010.01) | |
| *H01M 10/058* | (2010.01) | |

(52) U.S. Cl.
CPC ............ *H01M 2/1653* (2013.01); *H01M 2/164* (2013.01); *H01M 2/1673* (2013.01); *H01M 2/1686* (2013.01); *H01M 10/052* (2013.01); *H01M 10/0565* (2013.01); *H01M 2/168* (2013.01); *H01M 10/058* (2013.01); *H01M 10/0525* (2013.01); *H01M 2300/0085* (2013.01); *Y10T 29/4911* (2013.01); *Y10T 29/49108* (2013.01)

(58) Field of Classification Search
CPC . H01M 2/164; H01M 2/1653; H01M 2/1686; H01M 10/052; H01M 10/0565; H01M 2300/0082
See application file for complete search history.

(56) References Cited

U.S. PATENT DOCUMENTS

| | | | |
|---|---|---|---|
| 2003/0027045 A1* | 2/2003 | Morigaki et al. | ............. 429/217 |
| 2009/0202898 A1* | 8/2009 | Ichikawa et al. | ............. 429/144 |

FOREIGN PATENT DOCUMENTS

| | | |
|---|---|---|
| EP | 1213778 A2 | 6/2002 |
| JP | 05-310989 A | 11/1993 |
| JP | 09-012756 A | 1/1997 |
| JP | 09-161814 A | 6/1997 |
| JP | 10-172606 A | 6/1998 |
| JP | 11-080395 A | 3/1999 |
| JP | 11-329439 A | 11/1999 |
| JP | 2004-356102 A | 12/2004 |
| JP | 2006-012561 A | 1/2006 |
| JP | 2007-123254 A | 5/2007 |
| JP | 2007-157459 A | 6/2007 |
| JP | 2007-157569 A | 6/2007 |
| JP | 2007-157570 A | 6/2007 |
| JP | 2009-110683 A | 5/2009 |
| WO | WO 2006038362 A1 * | 4/2006 |

OTHER PUBLICATIONS

Communication dated Oct. 31, 2012 issued by the State Intellectual Property Office of PR China in counterpart Chinese Patent Application No. 200980111875.6.
Extended European Search Report issued on Jun. 7, 2011 in counterpart European Application No. 09727986.3.
International Search Report [PCT/ISA/210] issued Jun. 16, 2009, in PCT/JP2009/056720.

* cited by examiner

*Primary Examiner* — Eugenia Wang
(74) *Attorney, Agent, or Firm* — Sughrue Mion, PLLC

(57) ABSTRACT

The present invention relates to a battery separator including: a porous substrate; and a layer of a crosslinked polymer supported on at least one surface of the porous substrate, in which the crosslinked polymer is obtained by reacting (a) a reactive polymer having, in the molecule thereof, a reactive group containing active hydrogen with (b) a polycarbonate urethane prepolymer terminated by an isocyanate group.

8 Claims, No Drawings

BATTERY SEPARATOR AND BATTERY USING THE SAME

TECHNICAL FIELD

The present invention relates to a battery separator and a battery using the separator. More particularly, the invention relates to a battery separator obtained by supporting a layer of a crosslinked polymer having a polycarbonate urethane framework on a porous substrate, and relates to a battery using the separator.

BACKGROUND ART

Lithium ion secondary batteries having a high energy density are extensively used in recent years as power sources for small portable electronic appliances such as cell phones and notebook type personal computers. Such a lithium secondary battery is produced through the steps of stacking or winding sheet-form positive and negative electrodes together with, for example, a porous polyolefin resin film, introducing the resultant stack into a battery container constituted of, for example, a metallic can, subsequently pouring an electrolyte solution into the battery container, and tightly sealing the opening of the battery container.

Recently, however, such small portable electronic appliances are exceedingly strongly desired to be further reduced in size and weight. Under these circumstances, lithium ion secondary batteries also are desired to be further reduced in thickness and weight. Battery containers of the laminated-film type have also come to be used in place of conventional metallic can cases.

Compared with the conventional metallic can cases, battery containers of the laminated-film type have a drawback that an areal pressure for maintaining electrical connection between the separator and each electrode cannot be sufficiently applied to electrode surfaces. Because of this, these battery containers have a problem that the distance between the electrodes partly increases with the lapse of time due to the expansion/contraction of the electrode active materials during battery charge/discharge, resulting in an increase in the internal resistance of the battery and hence in a decrease in battery characteristics. In addition, there is a problem that unevenness of resistance occurs in the battery and this also reduces battery characteristics.

In the case of producing a sheet-form battery having a large area, there has been a problem that the distance between the electrodes cannot be kept constant and the internal resistance of the battery becomes uneven, making it impossible to obtain sufficient battery characteristics.

In order to overcome such problems, it has been proposed to bond electrodes to a separator with an adhesive resin layer constituted of a mixed phase including an electrolyte-solution phase, a polymer gel layer containing the electrolyte solution, and a solid polymer phase (see, for example, patent document 1). Furthermore, a method has been proposed which includes coating a separator with a binder resin solution containing a poly(vinylidene fluoride) resin as a main component, subsequently stacking electrodes on the coated separator, drying the binder resin solution to form an electrode stack, introducing the electrode stack into a battery container, and then pouring an electrolyte solution into the battery container to obtain a battery in which the separator has been adhered to the electrodes (see, for example, patent document 2).

It has also been proposed to obtain a battery containing electrodes adhered to a separator, by bonding a separator impregnated with an electrolyte solution to positive and negative electrodes with a porous adhesive resin layer to bring the separator into close contact with the electrodes and cause the adhesive resin layer to hold the electrolyte solution in the through-holes thereof (see, for example, patent document 3).

However, those processes have had the following problem. The thickness of the adhesive resin layer must be increased in order to obtain sufficient adhesive force between the separator and each electrode. Because of this and because the amount of the electrolyte solution relative to that of the adhesive resin cannot be increased, the resultant battery has increased internal resistance. Consequently, sufficient cycle characteristics and sufficient high-rate discharge characteristics cannot be obtained.

Furthermore, in the battery in which the separator has been adhered to the electrodes with an adhesive resin as described above, the adhesive strength between the separator and each electrode decreases when the battery is placed in a high-temperature environment. As a result, there is a concern that the separator might thermally contract to cause short-circuiting between the electrodes. In addition, although the adhesive resin in the battery is in the state of being swollen with the electrolyte solution, the adhesive resin layer has high internal resistance because electrolyte ions are less apt to diffuse in the adhesive resin than in the electrolyte solution, and exerts adverse influences on battery characteristics.

On the other hand, with respect to porous substrates for use as battery separators, various production processes have been known hitherto. One known process is to produce a sheet made of, for example, a polyolefin resin and stretch the sheet at a high ratio (see, for example, patent document 4). However, the battery separator constituted of such a porous film obtained through high-ratio stretching has a problem that the separator considerably contracts in high-temperature environments, such as the case where a battery has undergone abnormal heating due to internal short-circuiting, etc., and in some cases, comes not to function as a partition between the electrodes.

Consequently, to reduce the degree of heat shrinkage of battery separators which occurs in such a high-temperature environment is regarded as an important subject for improving the safety of batteries. In this respect, a process for producing a porous film for use as a battery separator in order to inhibit the heat shrinkage of battery separators occurring in high-temperature environments is, for example, known. This process includes melt-kneading ultrahigh-molecular polyethylene together with a plasticizer, extruding the mixture through a die into a sheet form, and then extracting and removing the plasticizer to produce the porous film (see patent document 5). However, this process, in contrast to the method described above, has a problem that the porous film obtained has insufficient strength because this film has not undergone stretching.

Moreover, an attempt is recently being made to heighten the charge voltage of batteries as one measure in increasing the capacity of batteries. However, to thus heighten the charge voltage, on the other hand, poses a problem that a large amount of lithium is deintercalated from composite oxides of lithium and cobalt or nickel, which are generally used as positive-electrode active materials, to bring these composite oxides into a higher degree of oxidized state having higher reactivity. As a result, the separator, in particular, deteriorates considerably, resulting in battery performance deterioration.

In order to overcome such a problem, it has been proposed to form a porous layer of a fluororesin such as a polytetrafluoroethylene resin between a separator and a positive electrode (see patent document 6). For example, there is a statement therein to the effect that a preferred method for forming a porous polytetrafluoroethylene resin layer is to spray a suspension of a polytetrafluoroethylene resin on a separator and dry the suspension. However, the layer obtained using this method has an increased thickness to sacrifice battery capacity although rich in porosity. In addition, use of this separator necessitates a large amount of an electrolyte solution.

Patent Document 1: JP-A-09-161814
Patent Document 2: JP-A-11-329439
Patent Document 3: JP-A-10-172606
Patent Document 4: JP-A-09-012756
Patent Document 5: JP-A-05-310989
Patent Document 6: JP-A-2007-157459

DISCLOSURE OF THE INVENTION

The invention has been achieved in order to overcome the various problems described above concerning battery separators. An object of the invention is to provide a battery separator which has, in particular, excellent oxidation resistance and further has adhesiveness to electrodes. Another object thereof is to provide a battery using such a battery separator.

Namely, the present invention relates to the following items (1) to (9).

(1) A battery separator including:
   a porous substrate; and
   a layer of a crosslinked polymer supported on at least one surface of the porous substrate,
   in which the crosslinked polymer is obtained by reacting
   (a) a reactive polymer having, in the molecule thereof, a reactive group containing active hydrogen with
   (b) a polycarbonate urethane prepolymer terminated by an isocyanate group.
(2) The battery separator according to (1), in which the reactive group containing active hydrogen is at least one kind selected from a hydroxy group, a carboxyl group and an amino group.
(3) The battery separator according to (1), in which the porous substrate is a porous polyolefin resin film.
(4) The battery separator according to (3), in which the porous polyolefin resin film is a porous polyethylene resin film.
(5) An electrode/separator laminate including:
   the separator according to any one of (1) to (4); and
   a positive electrode and a negative electrode laminated together with the separator interposed therebetween,
   in which at least one of the positive electrode and the negative electrode is adhered to the porous substrate by the crosslinked polymer.
(6) A battery including the electrode/separator laminate according to (5).
(7) The battery according to (6), in which the battery further includes a nonaqueous electrolyte solution and the layer of the crosslinked polymer faces at least the positive electrode.
(8) A process for producing a battery, the process including:
   stacking a positive electrode and a negative electrode together with the separator according to any one of (1) to (4) interposed therebetween;
   introducing the resultant stack into a battery container, followed by pouring a nonaqueous electrolyte solution into the battery container; and
   forming an electrode/separator laminate in which at least one of the positive electrode and the negative electrode is adhered to the porous substrate by the crosslinked polymer.
(9) The process for producing a battery according to (8), in which the positive electrode and the negative electrode are stacked together with the separator interposed therebetween so that the layer of the crosslinked polymer faces at least the positive electrode.

The battery separator of the invention is obtained by supporting on a porous substrate a layer of a crosslinked polymer obtained by reacting a reactive polymer having in the molecule thereof a reactive group containing active hydrogen with a polycarbonate urethane prepolymer terminated by an isocyanate group. The crosslinked polymer hence has excellent oxidation resistance and further has adhesiveness to electrodes.

Consequently, this battery separator can be adhered to electrodes by stacking the electrodes on the separator to obtain an electrode/separator stack; introducing the stack into a battery container; and subsequently pouring a nonaqueous electrolyte solution into the battery container to cause at least part of the crosslinked polymer on the porous substrate to swell around the interface between the crosslinked polymer and the electrode(s) and to penetrate into the electrode active material(s) together with the electrolyte solution. As a result, a battery having an electrode/separator laminate can be obtained.

Since the crosslinked polymer has a crosslinked structure, this polymer does not excessively dissolve or diffuse in the electrolyte solution when swelled in the electrolyte solution. The crosslinked polymer does not exert an adverse influence on the electrolyte solution.

Furthermore, since the crosslinked polymer is a polymer obtained by crosslinking a reactive polymer with a polycarbonate urethane prepolymer terminated by an isocyanate group and includes a polycarbonate structure, the crosslinked polymer has high oxidation resistance. Because of this, the battery separator of the invention supporting a layer of this crosslinked polymer has high resistance to the highly oxidizing environment present at the interface between the separator and the positive electrode. Thus, a battery having a high energy density and excellent charge/discharge characteristics can be provided.

BEST MODE FOR CARRYING OUT THE INVENTION (Porous Substrate)

The porous substrate to be used in the invention is preferably one having a thickness in the range of 3 to 50 μm. In case where the porous substrate has a thickness less than 3 μm, the porous substrate has insufficient strength and there is a concern that use of this porous substrate as a separator in a battery might result in internal short-circuiting between the electrodes. On the other hand, in case where the porous substrate has a thickness exceeding 50 μm, the battery using such a porous substrate as the separator has too large a distance between the electrodes, resulting in excessively high internal resistance of the battery.

The porous substrate to be use may be one which has pores having an average pore diameter of 0.01 to 5 μm and has a porosity in the range of 20 to 95%. The porosity thereof is preferably in the range of 30 to 90%, most preferably in the range of 35 to 85%. In case where the porous substrate has too low a porosity, use of this porous substrate as a battery separator results in a decrease in the amount of ion conduction paths, making it impossible to obtain sufficient battery characteristics. On the other hand, in case where the porous substrate has too high a porosity, this porous substrate has insufficient strength when used as a battery separator. Such a porous substrate must be thick from the standpoint of obtaining required strength. This is undesirable because the internal resistance of the battery increases.

Furthermore, the porous substrate to be use may be one which has an air permeability of 1,500 sec/100 cc or lower, preferably 1,000 sec/100 cc or lower. In case where the air permeability thereof is too high, this porous substrate has low ionic conductivity when used as a battery separator, making it impossible to obtain sufficient battery characteristics. With respect to the strength of the porous substrate, it is preferred that the porous substrate should have a puncture strength of 1 N or higher. This is because in case where the puncture strength thereof is lower than 1 N, there is a concern that this porous substrate might break when an areal pressure is applied to between the electrodes, resulting in internal short-circuiting.

It is preferred that the porous substrate should have a high affinity for the reactive polymer which will be described later. It is therefore preferred that when the porous substrate is constituted of a lowly polar material, the surface thereof should be subjected to a suitable surface-hydrophilizing treatment, such as a corona treatment, in order to improve the affinity for the reactive polymer.

According to the invention, the porous substrate is not particularly limited so long as it has the properties described above. However, when solvent resistance and strength are taken into account, porous films made of polyolefin resins such as polyethylene and polypropylene are suitable. However, a porous polyethylene resin film is especially suitable because this resin has the property of melting upon heating to close the pores and, as a result, can impart the so-called shutdown function to the battery. Examples of the polyethylene resin include not only ethylene homopolymers but also copolymers of ethylene and an α-olefin such as propylene, butene, or hexene.

In particular, according to the invention, a porous film obtained from ultrahigh-molecular polyethylene as polyethylene is suitable for use as the porous substrate. The term "ultrahigh-molecular polyethylene" means polyethylene having a weight-average molecular weight of 500,000 or higher, preferably in the range of 500,000 to 3,000,000, and various commercial products are available. A mixture of ultrahigh-molecular polyethylene and another resin may be formed into a porous film in order to enhance the moldability of ultrahigh-molecular polyethylene and the adhesiveness of the porous film obtained.

According to the invention, paper also can be used as the porous substrate besides porous films of polytetrafluoroethylene and of polyimides, polyesters, polycarbonates, regenerated cellulose, etc. Furthermore, such porous films containing an inorganic filler, e.g., silica, titanium oxide, alumina, or kaolinite, or a mineral filler, e.g., montmorillonite, dispersed therein can also be used as the porous substrate.

(Reactive Polymer)

The term "reactive polymer" in the invention means a polymer having in the molecule thereof a reactive group containing active hydrogen. The term "reactive group containing active hydrogen" means a group which has reactivity with an isocyanate group by the action of active hydrogen. Examples of such a reactive group include at least one kind selected from a hydroxy group, carboxyl group, and amino group.

As will be described later, a crosslinked polymer having a polycarbonate urethane framework can be obtained according to the invention by reacting such a reactive polymer with a polycarbonate urethane prepolymer terminated by an isocyanate group. The polycarbonate urethane prepolymer terminated by an isocyanate group can be obtained by reacting a polycarbonate diol with a polyfunctional isocyanate.

Preferably, the reactive polymer can be obtained by subjecting a first radical-polymerizable monomer, which has the reactive group, and a second radical-polymerizable monomer, which does not have such a reactive group, to radical copolymerization using a radical polymerization initiator.

The radical-polymerizable monomer having a reactive group is used in an amount in the range of 0.1 to 10% by weight, preferably 0.5 to 5% by weight, of the total monomer amount. In case where the amount of the radical-polymerizable monomer having a reactive group is smaller than 0.1% by weight of the total monomer amount, the resultant reactive polymer, when reacted with the isocyanate-terminated polycarbonate urethane prepolymer, which will be described later, gives a crosslinked polymer having too low an insoluble content. When an electrode/separator stack is immersed in an electrolyte solution, this crosslinked polymer is not sufficiently inhibited from dissolving or diffusing in the electrolyte solution because of the too low insoluble content, and dissolves and diffuses in an increased amount. As a result, adhesion between the porous substrate and the electrode(s) cannot be maintained, and there is a concern that battery deterioration might be accelerated by the impurities. However, in case where the amount of the radical-polymerizable monomer having a reactive group is larger than 10% by weight, the resultant crosslinked prepolymer has too high a crosslink density. This crosslinked polymer is excessively dense and does not sufficiently swell when in contact with an electrolyte solution. As a result, an electrode/separator laminate cannot be obtained, and a battery having excellent characteristics cannot be obtained.

Examples of the first radical-polymerizable monomer, which has a reactive group, are as follows. Examples of the monomer in which the reactive group is a carboxyl group include (meth)acrylic acid, itaconic acid, and maleic acid. Examples of the monomer in which the reactive group is a hydroxy group include hydroxyalkyl (meth)acrylates such as 2-hydroxyethyl (meth)acrylate, 3-hydroxypropyl (meth)acrylate, 4-hydroxybutyl (meth)acrylate, and 6-hydroxyhexyl (meth)acrylate, (poly)alkylene glycol mono(meth)acrylates such as ethylene glycol mono(meth)acrylate, diethylene glycol mono(meth)acrylate, triethylene glycol mono(meth)acrylate, hexaethylene glycol mono(meth)acrylate, propylene glycol mono(meth)acrylate, dipropylene glycol mono(meth)acrylate, tripropylene glycol mono(meth)acrylate, and pentapropylene glycol mono(meth)acrylate, and products of the ring-opening addition of 2-hydroxyethyl (meth)acrylate with γ-butyrolactone. Examples of the monomer in which the reactive group is an amino group include products of the 1:1 reaction of a diamine with (meth)acryloyloxyethyl isocyanate.

The term "(meth)acrylic acid" means acrylic acid or methacrylic acid, "(meth)acrylate" means acrylate or methacrylate, and "(meth)acryloyloxy" means acryloyloxy or methacryloyloxy.

On the other hand, preferred examples of the second radical-polymerizable monomer, which has no reactive group, include (meth)acrylates represented by general formula (I):

[Chem. 1]

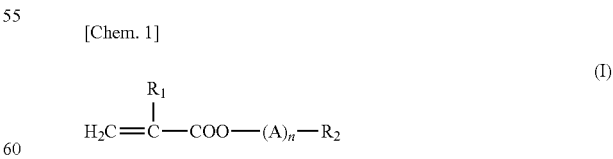

(I)

in which $R_1$ represents a hydrogen atom or a methyl group; A represents an oxyalkylene group having 2 or 3 carbon atoms (preferably, oxyethylene or oxypropylene); $R_2$ represents an alkyl group having 1 to 6 carbon atoms or a fluoroalkyl group having 1 to 6 carbon atoms; and n represents an integer of 0 to 12;

and vinyl esters represented by general formula (II):

[Chem. 2]

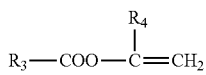

(II)

in which $R_3$ represents a methyl group or an ethyl group, and $R_4$ represents a hydrogen atom or a methyl group.

Examples of the (meth)acrylates represented by general formula (I) include methyl (meth)acrylate, ethyl (meth)acrylate, propyl (meth)acrylate, butyl (meth)acrylate, 2,2,2-trifluoroethyl (meth)acrylate, and 2,2,3,3-tetrafluoropropyl (meth)acrylate.

Besides the examples given above, examples of the (meth)acrylates represented by general formula (I) include the following:

[Chem. 3]

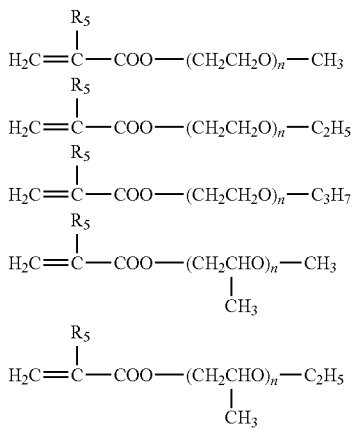

in which $R_5$ represents a hydrogen atom or a methyl group, and n is an integer of 0 to 12.

Examples of the vinyl esters represented by general formula (II) include vinyl acetate and vinyl propionate.

As described above, the reactive polymer can be obtained by subjecting the first radical-polymerizable monomer, which has a reactive group, and the second radical-polymerizable monomer, which has no reactive group, to radical copolymerization using a radical polymerization initiator. This radical copolymerization may be conducted using any polymerization technique selected from solution polymerization, bulk polymerization, suspension polymerization, emulsion polymerization, and the like. However, it is preferred to employ solution polymerization or suspension polymerization from the standpoints of ease of polymerization, molecular-weight regulation, post-treatment, etc.

The radical polymerization initiator is not particularly limited. For example, use may be made of N,N'-azobisisobutyronitrile, dimethyl N,N'-azobis(2-methylpropionate), benzoyl peroxide, lauroyl peroxide, or the like. In this radical copolymerization, a molecular weight regulator such as a mercaptan can be used according to need.

In the invention, the reactive polymer preferably has a weight-average molecular weight of 10,000 or higher. In case where the weight-average molecular weight of the reactive polymer is lower than 10,000, the crosslinked polymer obtained therefrom is less apt to swell with an electrolyte solution and this reduces the characteristics of the battery to be obtained. On the other hand, the upper limit of the weight-average molecular weight of the reactive polymer is not particularly limited. However, the upper limit thereof may be about 3,000,000, preferably about 2,500,000, from the standpoint that the crosslinked polymer to be obtained therefrom can retain an electrolyte solution as a gel. In particular, it is preferred according to the invention that the reactive polymer should have a weight-average molecular weight in the range of 100,000 to 2,000,000.

(Polycarbonate Urethane Prepolymer Terminated by Isocyanate Group)

The polycarbonate urethane prepolymer terminated by an isocyanate group (hereinafter referred to simply as urethane prepolymer) in the invention is an oligomer preferably obtained by reacting an aliphatic polycarbonate diol with a polyfunctional isocyanate in such a proportion that the molar ratio of the isocyanate groups possessed by the polyfunctional isocyanate to the hydroxy groups possessed by the polycarbonate diol (hereinafter referred to as NCO/OH molar ratio) is generally in the range of 1.2 to 3.3, preferably in the range of 1.5 to 2.5. Although the molecular weight of the urethane prepolymer to be obtained changes with the NCO/OH molar ratio, a urethane prepolymer in which both ends of the molecule each substantially are an isocyanate group can be obtained when the NCO/OH molar ratio is regulated so as to be within that range.

As is already well known, the aliphatic polycarbonate diol can be obtained, for example, by reacting an aliphatic diol with phosgene or by the ring-opening polymerization of an alkylene carbonate. In the case of obtaining the polycarbonate diol by reacting an aliphatic diol with phosgene, the aliphatic diol to be used is not particularly limited. Examples thereof include ethylene glycol, diethylene glycol, propylene glycol, dipropylene glycol, trimethylene glycol, 1,4-tetramethylenediol, 1,5-pentamethylenediol, neopentyl glycol, 1,6-hexamethylenediol, and 1,4-cyclohexanediol. These aliphatic diols may be used alone or in combination of two or more thereof.

In the use of obtaining the polycarbonate diol by the ring-opening polymerization of an alkylene carbonate, the alkylene carbonate to be used is also not particularly limited. Examples thereof include ethylene carbonate, trimethylene carbonate, tetramethylene carbonate, and hexamethylene carbonate. These alkylene carbonates also may be used alone or as a mixture of two or more thereof.

The aliphatic polycarbonate diol can be obtained also by reacting an alkylene carbonate, such as those shown above, or a dialkyl carbonate with the aliphatic diol. Examples of the dialkyl carbonate include dimethyl carbonate, diethyl carbonate, di-n-propyl carbonate, and di-n-butyl carbonate.

According to the invention, the aliphatic polycarbonate diol to be used preferably has repeating units represented by general formula (III):

[Chem. 4]

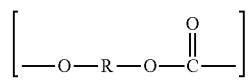

(III)

in which R represents an aliphatic diol residue having 2 to 6 carbon atoms. In the repeating units represented by general formula (III), however, the aliphatic diol residues, i.e., alkylene groups, of R in the respective repeating units may differ in the number of carbon atoms.

For example, according to the invention, the aliphatic polycarbonate diol to be used may be one having repeating units represented by general formula (IIIa) and general formula (IIIb):

[Chem. 5]

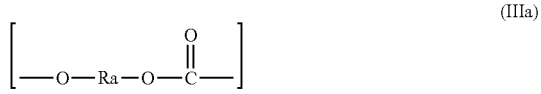

(IIIa)

(IIIb)

in which Ra and Rb each represent an aliphatic diol residue having 2 to 6 carbon atoms, but differ from each other in the number of carbon atoms.

The aliphatic diol residue having 2 to 6 carbon atoms, as described above, is the aliphatic hydrocarbon group contained in an aliphatic diol such as, for example, ethylene glycol, 1,3-trimethylenediol, 1,4-tetramethylenediol, 1,5-pentamethylenediol, neopentyl glycol, 1,6-hexamethylenediol, or 1,4-cyclohexanediol, and preferably is a linear or branched alkylene group.

On the other hand, as the polyfunctional isocyanate, use can be made of an aromatic, araliphatic, alicyclic, or aliphatic diisocyanate such as, for example, phenylene diisocyanate, tolylene diisocyanate, diphenylmethane diisocyanate, diphenyl ether diisocyanate, hexamethylene diisocyanate, or cyclohexane diisocyanate. Besides these, use may be made of a so-called isocyanate adduct obtained by causing a polyol such as trimethylolpropane to add any of these diisocyanates.

(Crosslinked Polymer and Battery Separator)

According to the invention, the reactive polymer is reacted with the urethane prepolymer to thereby crosslink the reactive polymer with the prepolymer. Thus, a crosslinked polymer having a polycarbonate urethane framework can be obtained. The battery separator according to the invention is one obtained by supporting a layer of such a crosslinked polymer on the porous substrate. Namely, the battery separator according to the invention includes a porous substrate and a layer of the crosslinked polymer supported thereon.

According to the invention, to support a layer of the crosslinked polymer on at least one surface of a porous substrate may suffice for the function of the desired battery separator. Furthermore, it is possible to support a layer of the crosslinked polymer not only as a continuous layer but also in any of various arrangements.

For supporting a crosslinked polymer on a porous substrate, use may be made, for example, of a method including dissolving the reactive polymer and the urethane prepolymer in a suitable solvent, e.g., acetone, ethyl acetate, butyl acetate, or toluene, applying the resultant solution to a porous substrate by a suitable technique, e.g., casting or spray coating, and subsequently reacting the reactive polymer with the urethane prepolymer to crosslink the reactive polymer either after heating the coating to remove the solvent used or while heating the coating to remove the solvent used.

Another method may be used, in which a solution containing the reactive polymer and the urethane prepolymer is applied to a release sheet and dried to form on the release sheet a thin layer containing a mixture of the reactive polymer and the urethane prepolymer. Thereafter, this release sheet is superposed on a porous substrate, and the stack is heated and pressed to transfer the thin layer of a mixture of the reactive polymer and the urethane prepolymer to the porous substrate. Subsequently, the thin layer of a mixture of the reactive polymer and the urethane prepolymer on the porous substrate is heated to react the reactive polymer with the urethane prepolymer and crosslink the reactive polymer. In either method, heating at 90° C. for 48 hours, for example, suffices for reacting the reactive polymer with the urethane prepolymer.

Furthermore, the above-mentioned methods each may be conducted in the following manner. A solution containing the reactive polymer and the urethane prepolymer is prepared and heated to partially react and crosslink the reactive polymer with the urethane prepolymer beforehand to such a degree that the crosslinked polymer yielded does not undergo phase separation in the solution. Thereafter, this solution is applied to a porous substrate or a release sheet, heated to remove the solvent, and further heated to react the reactive polymer with the urethane prepolymer and crosslink the reactive polymer.

It is typically preferred that the release sheet to be used should be a polypropylene resin sheet. However, the release sheet is not limited thereto, and usable sheets include, for example, sheets of poly(ethylene terephthalate), polyethylene, vinyl chloride, engineering plastics, and the like, paper (in particular, resin-impregnated paper), synthetic papers, laminates of these, and the like. These sheets may have undergone a back treatment with a compound such as a silicone or long-chain alkyl compound according to need.

When a layer of the crosslinked polymer having a polycarbonate urethane framework formed by reacting the reactive polymer with the urethane prepolymer is supported on a porous substrate, the proportions of the reactive polymer and urethane prepolymer to be used depend not only on the amount of reactive groups contained in the reactive polymer and the amount of isocyanate groups contained in the urethane prepolymer but also on the properties, e.g., molecular weights, of the reactive polymer and urethane prepolymer. Usually, however, the proportion of the urethane prepolymer is in the range of 10 to 150 parts by weight per 100 parts by weight of the reactive polymer. In case where the proportion of the urethane prepolymer per 100 parts by weight of the reactive polymer is smaller than 10 parts by weight, the crosslinked polymer obtained does not have satisfactory oxidation resistance. On the other hand, in case where the proportion of the urethane prepolymer per 100 parts by weight of the reactive polymer is larger than 150 parts by weight, the crosslinked polymer obtained has too high a crosslink density. Even when a porous substrate having such a crosslinked polymer supported thereon is used for battery production, a battery having excellent characteristics cannot be obtained.

In the invention, the amount of the reactive polymer and urethane prepolymer to be supported on a porous substrate, i.e., the amount of the crosslinked polymer to be supported on a porous substrate, is generally in the range of 0.2 to 5.0 g/m$^2$, preferably in the range of 0.3 to 3.0 g/m$^2$, although the amount thereof depends on the kinds of the reactive polymer and urethane prepolymer used and on the manner in which these ingredients are supported on the porous substrate. In case where the amount of the crosslinked polymer supported on the porous substrate is too small, the separator obtained does not adhere to an electrode at sufficient adhesive force. Conversely, too large amounts thereof are undesirable because the battery using the separator thus obtained has reduced characteristics.

According to the invention, the crosslinked polymer obtained by reacting the reactive polymer with the urethane prepolymer has an insoluble content in the range of 50 to 99% by weight, preferably 60 to 99% by weight, more preferably 70 to 99% by weight. The term "insoluble content" herein means the proportion of the crosslinked polymer remaining on a porous substrate after the porous substrate having the crosslinked polymer supported thereon is immersed in ethyl acetate at room temperature with stirring for 6 hours.

(Battery)

Electrodes are stacked together with the separator according to the invention obtained by the method described above. For example, a positive electrode and a negative electrode are stacked together with the separator according to the invention interposed therebetween. According to need, the stack is pressed with heating to conduct press-bonding. Thus, the electrodes are temporarily adhered and stacked to the separator, and an electrode/separator stack can be obtained.

The electrodes, i.e., the negative electrode and positive electrode, to be used in the invention generally are sheet electrodes obtained by supporting an active material optionally together with a conductive material on a conductive substrate by a resin binder, although this varies depending on the battery.

In the invention, the electrode/separator stack is not limited so long as electrodes have been stacked together with the separator. Consequently, the electrode/separator stack to be used is, for example, one for obtaining a negative electrode/separator/positive electrode configuration, a negative electrode/separator/positive electrode/separator configuration, or the like according to the structure and shape of the battery. The electrode/separator stack may be in a sheet form or may have been wound.

Battery production using the separator according to the invention is explained. As described above, electrodes are stacked or wound together with the separator and temporarily adhered thereto to obtain an electrode/separator stack. Subsequently, this stack is introduced into a battery container constituted of a metallic can, laminated film, or the like, and terminal welding or the like is conducted if necessary. Thereafter, a given amount of a nonaqueous electrolyte solution is poured into the battery container, and the opening of this battery container is tightly sealed. At least part of the crosslinked polymer supported on the separator is swelled in the electrolyte solution around the interface between the separator and each electrode and caused to penetrate into interstices of the electrode active material. The crosslinked polymer is thereby caused to produce an anchoring effect on both the porous substrate and the electrode. An electrode/separator laminate in which the electrodes have been adhered to the porous substrate by the action of the crosslinked polymer can be thereby obtained. Thus, a battery having the electrode/separator laminate can be obtained.

According to the invention, since the crosslinked polymer supported on the porous substrate has a high insoluble content as described above, the crosslinked polymer, when immersed in an electrolyte solution in battery fabrication, is inhibited from dissolving or diffusing in the electrolyte solution. Consequently, the crosslinked polymer, when used in battery production, rarely dissolves in the electrolyte solution to reduce battery characteristics.

In general, the wettability of the electrodes by the electrolyte solution is dramatically improved by initial charge/discharge. Simultaneously with the improvement in wettability, the crosslinked polymer swelled with the electrolyte solution further penetrates into the interstices of the electrode active materials to render the separator/electrode adhesion more tenacious.

According to the invention, by introducing the electrode/separator stack into a battery container, pouring an electrolyte solution into the battery container, and then heating the stack, the crosslinked polymer supported on the porous substrate can be brought into closer contact with the electrodes. Conditions for the heating may generally include a temperature of 40 to 100° C. and a period of about 0.5 to 24 hours, although the heat resistance of the materials constituting the battery and productivity should also be taken into account.

In the battery separator according to the invention, the crosslinked polymer, on one hand, functions as an adhesive for adhering an electrode to the separator, as described above, and is useful for forming an electrode/separator laminate. By thus forming an electrode/separator laminate, the battery can be inhibited from suffering a trouble that an electrode slides on the separator and is exposed or a trouble that the separator contracts to expose an electrode.

In particular, according to the invention, the separator in the battery obtained is adherent to the electrodes. Consequently, even when the battery is placed in a high-temperature environment such as, for example, a 150° C. environment, the separator (strictly speaking, the porous substrate) has a low degree of areal heat shrinkage, which is generally 20% or lower, preferably 15% or lower.

As described above, the mode in which a layer of the crosslinked polymer is supported on a porous substrate is not particularly limited according to the invention so long as the crosslinked polymer satisfies the function as an adhesive. Consequently, a layer of the crosslinked polymer may be supported on the whole area of a surface of the porous substrate or, in some cases, may be supported partly on the surface, for example, partly supported in a stripe, spot, lattice, streak, or honeycomb arrangement. Furthermore, a layer of the crosslinked polymer may be supported only on one surface of a porous substrate or on both surfaces thereof.

Moreover, in the battery separator according to the invention, the crosslinked polymer has high oxidation resistance because the crosslinked polymer has a crosslinked structure formed by crosslinking the reactive polymer using the urethane prepolymer as a crosslinking agent as described above and has a polycarbonate framework. Consequently, the separator according to the invention, on another hand, has the function of imparting high oxidation resistance to the porous substrate constituting the separator, and is useful. Especially when the separator substrate is a porous film of a polyolefin resin such as polyethylene or polypropylene, use of a heightened charge voltage makes the positive-electrode active material have a highly oxidized state and high oxidation reactivity and, hence, the separator is apt to be damaged and deteriorated, as described above. In such cases, however, by using the separator constituted of a porous polyolefin resin film having a layer of the crosslinked polymer supported thereon to form an electrode/separator laminate so that the layer of the crosslinked polymer is located on the positive-electrode side, excellent oxidation resistance can be imparted to the separator. Thus, a battery having a high energy density and excellent charge/discharge characteristics can be obtained.

The nonaqueous electrolyte solution is a solution prepared by dissolving an electrolyte salt in a suitable organic solvent. As the electrolyte salt, use can be made of salts composed of: a cation component which is hydrogen, an alkali metal such as lithium, sodium, or potassium, an alkaline earth metal such as calcium or strontium, a tertiary or quaternary ammonium salt, or the like; and an anion component which is an inorganic acid such as hydrochloric acid, nitric acid, phosphoric acid, sulfuric acid, borofluoric acid, hydrofluoric acid, hexafluorophosphoric acid, or perchloric acid or an organic acid such as a carboxylic acid, organic sulfonic acid, or fluorine-substituted organic sulfonic acid. Especially preferred of these are electrolyte salts in which the cation component is an alkali metal ion.

Examples of such electrolytic salts in which the cation component is an alkali metal ion include alkali metal perchlorates such as lithium perchlorate, sodium perchlorate, and potassium perchlorate, alkali metal tetrafluoroborates such as lithium tetrafluoroborate, sodium tetrafluoroborate, and potassium tetrafluoroborate, alkali metal hexafluorophosphates such as lithium hexafluorophosphate and potassium hexafluorophosphate, alkali metal trifluoroacetates such as lithium trifluoroacetate, and alkali metal trifluoromethanesulfonates such as lithium trifluoromethanesulfonate.

Especially in the case of obtaining a lithium ion secondary battery according to the invention, suitable examples of the electrolyte salt to be used are lithium hexafluorophosphate, lithium tetrafluoroborate, lithium perchlorate, and the like.

The solvent to be used for the electrolyte salt in the invention can be any solvent in which the electrolyte salt dissolves. Usable nonaqueous solvents include cyclic esters such as ethylene carbonate, propylene carbonate, butylene carbonate, and γ-butyrolactone, ethers such as tetrahydrofuran and dimethoxyethane, and chain esters such as dimethyl carbonate, diethyl carbonate, and ethyl methyl carbonate. These solvents may be used alone or as a mixture of two or more thereof.

EXAMPLES

The invention will be explained below by reference to Examples. However, the invention should not be construed as being limited by the following Examples in any way. In the following, properties of porous substrates and battery characteristics were evaluated in the manners shown below.

(Thickness of Porous Substrate)

The thickness of a porous substrate was determined through a measurement with a 1/10,000 mm thickness gauge and based on a photograph of a section of the porous substrate taken with a scanning electron microscope at a magnification of 10,000.

(Porosity of Porous Substrate)

The porosity of a porous substrate was calculated using the following equation from the weight W (g) per unit area S ($cm^2$) of the porous substrate, the average thickness t (cm) thereof, and the density d ($g/cm^3$) of the resin constituting the porous substrate.

Porosity (%)=(1−(W/S/t/d))×100

(Air Permeability of Porous Substrate)

The air permeability of a porous substrate was determined according to JIS P 8117.

(Puncture Strength of Porous Substrate)

A puncture test of a porous substrate was conducted using compression tester KES-G5, manufactured by Kato Tech Co., LTD. The maximum load was read from a load-deformation curve obtained in the measurement and was taken as the puncture strength. A needle having a diameter of 1.0 mm and a radius of curvature of the tip of 0.5 mm was used to conduct the test at a rate of 2 mm/sec.

(Insoluble Content of Crosslinked Polymer)

A porous substrate having a crosslinked polymer supported thereon in a known amount A was weighed to measure the weight B thereof. Subsequently, this porous substrate having the crosslinked polymer supported thereon was immersed in ethyl acetate at room temperature for 6 hours and then air-dried. Thereafter, the thus-treated porous substrate having the crosslinked polymer supported thereon was weighed to measure the weight C thereof. The insoluble content of the crosslinked polymer was calculated using the following equation.

Insoluble content (%)=((A−(B−C))/A)×100

Reference Example 1

(Preparation of Electrode Sheets)

Eighty-five parts by weight of lithium cobalt oxide (Cellseed C-10, manufactured by Nippon Chemical Industrial Co., Ltd.) as a positive-electrode active material was mixed with 10 parts by weight of acetylene black (Denka Black, manufactured by Denki Kagaku Kogyo K.K.) as a conduction aid material and 5 parts by weight of a vinylidene fluoride resin (KF Polymer L #1120, manufactured by Kureha Chemical Industry Co., Ltd.) as a binder. This mixture was slurried with N-methyl-2-pyrrolidone so as to result in a solid concentration of 15% by weight. This slurry was applied in a thickness of 200 μm to an aluminum foil having a thickness of 20 μm (current collector) and vacuum-dried at 80° C. for 1 hour and then at 120° C. for 2 hours. The coated foil was pressed with a roller press to prepare a positive-electrode sheet having an active-material layer with a thickness of 100 μm.

Eighty parts by weight of mesocarbon microbeads (MCMB 6-28, manufactured by Osaka Gas Chemical Co., Ltd.) as a negative-electrode active material were mixed with 10 parts by weight of acetylene black (Denka Black, manufactured by Denki Kagaku Kogyo K.K.) as a conduction aid material and 10 parts by weight of a vinylidene fluoride resin (KF Polymer L #1120, manufactured by Kureha Chemical Industry Co., Ltd.) as a binder. This mixture was slurried with N-methyl-2-pyrrolidone so as to result in a solid concentration of 15% by weight. This slurry was applied in a thickness of 200 μm to a copper foil having a thickness of 20 μm (current collector) and dried at 80° C. for 1 hour and then dried at 120° C. for 2 hours. The coated foil was pressed with a roller press to prepare a negative-electrode sheet having an active-material layer with a thickness of 100 μm.

Reference Example 2

(Production of Porous Polyethylene Resin Film)

Fifteen parts by weight of ultrahigh-molecular polyethylene having a weight-average molecular weight of 1,000,000 (melting point, 137° C.) was evenly mixed with 85 parts by weight of liquid paraffin to obtain a slurry. This slurry was melt-kneaded with a twin-screw extruder at a temperature of 170° C. and extruded through a coathanger die into a sheet having a thickness of 2 mm. The resultant sheet was cooled while being taken off with a roll. Thus, a gel sheet having a thickness of 1.3 mm was obtained. This gel sheet was subjected at a temperature of 123° C. to simultaneous biaxial stretching in which the sheet was stretched in the MD (machine direction) 4.5 times and in the TD (transverse direction) 5 times. Thus, a stretched film was obtained.

Decane was used to remove the liquid paraffin from the stretched film. Thereafter, the film was dried at room temperature to remove the decane. Thus, a porous film was obtained. The porous film obtained was heat-treated at 125° C. in air for 3 minutes to obtain a porous polyethylene resin film. The porous film obtained had a thickness of 16 μm, porosity of 39%, an air permeability of 270 sec/100 cc, and a puncture strength of 4 N.

Comparative Example 1

The negative-electrode sheet obtained in Reference Example 1, the porous polyethylene resin film obtained in Reference Example 2, and the positive-electrode sheet obtained in Reference Example 1 were stacked in this order to obtain an electrode/porous film stack. This stack was introduced into an aluminum laminate package, and an electrolyte solution constituted of an ethylene carbonate/diethyl carbonate (1/1 by weight) mixed solvent containing lithium hexafluorophosphate dissolved therein in a concentration of 1.4 mol/L was poured into the package, which was then sealed. Thereafter, the resultant battery was charged at a current of 0.2 CmA until the voltage reached 3.5 V. Thus, a sealed laminate type battery was obtained.

(Evaluation of Battery Characteristics)

The battery obtained was charged and discharged twice at room temperature at a current of 0.2 CmA. Thereafter, this battery was subjected to tests for evaluating the following three items of battery characteristics. Separate batteries were respectively subjected to the tests for evaluating the following three items of battery characteristics.

(Rate Characteristics)

A battery was charged at 0.2 CmA and then discharged at 0.2 CmA to determine the 0.2 CmA discharge capacity A. Subsequently, the battery was charged at 0.2 CmA and then discharged at 2 CmA to determine the 2 CmA discharge capacity B. The rate characteristics were calculated on the basis of the following equation.

Rate characteristics (%)=(2 CmA discharge capacity $B$)/(0.2 CmA discharge capacity $A$)

Batteries which had been evaluated for rate characteristics in the manner described above were subjected to the following Determination of Degree of Areal Shrinkage of Porous Substrate.

(Determination of Degree of Areal Shrinkage of Porous Substrate)

A battery which had been examined for rate characteristics, which are the evaluation item of battery characteristics described above, was sandwiched between a pair of glass plates, and the opposed ends of the pair of glass plates were fixed with a polyimide tape in order to prevent the distance between the glass plates from enlarging. Thus, a test structure was assembled. This test structure was placed in 150° C. drying oven for 1 hour and then cooled. Subsequently, this test structure was disassembled, and the porous substrate was peeled from the electrode/crosslinked-polymer-supporting porous substrate laminate obtained. This porous substrate was read with a scanner and compared in area with the porous substrate which had not been tested. Thus, the degree of areal shrinkage of the porous substrate was determined.

(Continuous Charge Characteristics)

A battery was placed in a thermostatic chamber having a temperature of 60° C. and subjected to constant-current constant-voltage charge at a current of 0.2 CmA and a voltage of 4.25 V. During charge at a current of 0.2 CmA, when the battery voltage has reached 4.25 V, the current value decreases. However, a phenomenon is observed in which the current value which once decreased in that situation increases again. This phenomenon is thought to indicate that some chemical reaction is taking place in the vicinity of the positive electrode, which is highly active, at a high voltage. Because of this, current behavior in the charge described above was examined for 7 days as an index for evaluating the oxidation resistance of the separator. When an increase in current value was observed in this examination, the time period from the initiation of the test to the point of time when the increase in current value was observed was measured. In the case where no increase in current value was observed in the 7-day examination, this battery is indicated by "no increase".

(High-Temperature Storage Test)

A battery was continuously subjected for 12 hours to constant-current constant-voltage charge at a current of 0.2 CmA and a voltage of 4.2 V. Subsequently, the battery in the fully charged state was stored in an 80° C. thermosetting chamber for 4 days and then examined for battery voltage at a temperature of 80° C.

The results of the rate characteristics, continuous charge characteristics, and high-temperature storage test of the battery are shown in Table 1 together with the degree of areal shrinkage of the porous substrate in the battery.

Reference Example 3

(Preparation of Reactive Polymer)

Into a three-necked flask having a capacity of 500 mL and equipped with a reflux condenser were introduced 84 g of methyl methacrylate, 2.0 g of 4-hydroxybutyl acrylate, 14.0 g of 2-methoxyethyl acrylate, 25 g of ethyl acetate, and 0.20 g of N,N'-azobisisobutyronitrile. While nitrogen gas was being introduced, the contents were stirred and mixed for 30 minutes and then heated to 70° C. to initiate radical polymerization. At the time when about 1 hour had passed, an increase in the viscosity of the reaction mixture was observed. Thereafter, while ethyl acetate was being added to the reaction mixture, the temperature was kept almost constant and the polymerization was continued for further 8 hours.

After completion of the reaction, the reaction mixture obtained was cooled to 40° C., and ethyl acetate was added thereto. The contents were stirred and mixed until the mixture became wholly homogeneous. Thus, an ethyl acetate solution of a reactive polymer (concentration, 15% by weight) was obtained.

Subsequently, 100 g of the polymer solution was added to 600 mL of heptane with stirring with a high-speed mixer to precipitate the polymer. The polymer was taken out by filtration, repeatedly washed with heptane several times, dried in air, and then vacuum-dried in a desiccator for 6 hours to obtain the reactive polymer as a white powder.

Comparative Example 2

Ten grams of the reactive polymer obtained in Reference Example 3 was dissolved in ethyl acetate at room temperature to prepare a reactive-polymer solution having a concentration of 10% by weight. Thereto was added 3.14 g of a polyfunctional isocyanate (hexamethylene diisocyanate/trimethylolpropane adduct; ethyl acetate solution; solid content 25%; Coronate HL, manufactured by Nippon Polyurethane Co., Ltd.). The polyfunctional isocyanate was dissolved therein to prepare a coating fluid containing the reactive polymer and the polyfunctional isocyanate.

This coating fluid was applied to one side of a polypropylene resin sheet with a wire-wound bar and then heated at 50° C. for 5 minutes to volatilize the ethyl acetate. Thus, a thin layer constituted of a mixture of the reactive polymer and the polyfunctional isocyanate was formed on the polypropylene resin sheet.

This polypropylene resin sheet was superposed on the porous polyethylene resin film obtained in Reference Example 2, so that the thin layer constituted of a mixture of the reactive polymer and the polyfunctional isocyanate was in contact with the porous film. The resultant stack was passed through the nip between laminating rolls heated at a temperature of 125° C. and was thereby heated and pressed to transfer the thin layer constituted of a mixture of the reactive polymer and the polyfunctional isocyanate to one side of the porous polyethylene resin film.

Subsequently, the stack composed of the porous polyethylene resin film having the thin layer and the polypropylene resin sheet was heated at 90° C. for 48 hours to react the reactive polymer with the polyfunctional isocyanate and crosslink the reactive polymer, thereby forming a crosslinked polymer. Thereafter, the polypropylene resin sheet was peeled off to obtain a porous polyethylene resin film having the crosslinked polymer supported on one side thereof. The amount of the crosslinked polymer supported on the porous polyethylene resin film was 0.5 g/m$^2$.

For reasons of convenience, the weight of the crosslinked polymer present on the porous polyethylene resin film was taken as the weight of the thin layer constituted of a mixture of the reactive polymer and the polyfunctional isocyanate and formed on the polypropylene resin sheet, and the amount of the crosslinked polymer supported on the porous polyethylene resin film was determined in the following manner. Namely, a piece having a size of 5 cm×2 cm was cut out of the polypropylene resin sheet on which the thin layer constituted of a mixture of the reactive polymer and the polyfunctional isocyanate had been formed, and the weight A thereof was measured. Subsequently, the thin layer constituted of a mixture of the reactive polymer and the polyfunctional isocyanate was completely removed from the polypropylene resin sheet, and the weight B of this polypropylene resin sheet was thereafter measured. The amount of the crosslinked polymer on the porous polyethylene resin film was calculated using (A−B)× 1,000 (g/m$^2$).

The negative-electrode sheet obtained in Reference Example 1, the porous polyethylene resin film having the crosslinked polymer supported thereon, and the positive-electrode sheet obtained in Reference Example 1 were stacked in this order so that the crosslinked polymer on the porous film faced the positive-electrode sheet. Thus, an electrode/crosslinked-polymer-supporting porous polyethylene resin film stack was obtained. This stack was introduced into an aluminum laminate package, and an electrolyte solution constituted of an ethylene carbonate/diethyl carbonate (1/1 by weight) mixed solvent containing lithium hexafluorophosphate dissolved therein in a concentration of 1.4 mol/L was poured into the package, which was then sealed. Thereafter, the resultant battery was charged at a current of 0.2 CmA until the voltage reached 3.5 V, and was then placed in a 50° C. thermostatic chamber for 24 hours to accelerate adhesion between the electrode sheets and the separator. Thus, a sealed laminate type battery was obtained.

With respect to the battery obtained, the results of the rate characteristics, continuous charge characteristics, and high-temperature storage test of the battery are shown in Table 1 together with the degree of areal shrinkage of the porous substrate, as in the case of Comparative Example 1.

Reference Example 4

(Preparation of Reactive Polymer)

Into a three-necked flask having a capacity of 500 mL and equipped with a reflux condenser were introduced 98 g of methyl methacrylate, 2.0 g of 4-hydroxybutyl acrylate, 25 g of ethyl acetate, and 0.20 g of N,N'-azobisisobutyronitrile. While nitrogen gas was being introduced, the contents were stirred and mixed for 30 minutes and then heated to 70° C. to initiate radical polymerization. At the time when about 2 hours had passed, an increase in the viscosity of the reaction mixture was observed. Thereafter, while ethyl acetate was being added, the temperature was kept almost constant and the polymerization was continued for further 8 hours.

After completion of the reaction, the reaction mixture obtained was cooled to 40° C., and ethyl acetate was added thereto. Thereafter, the contents were stirred and mixed with heating until the mixture became wholly homogeneous. Thus, a reactive-polymer solution (concentration, 25% by weight) was obtained.

Subsequently, 100 g of the polymer solution was added to 600 mL of heptane with stirring with a high-speed mixer to precipitate the polymer. The polymer was taken out by filtration, repeatedly washed with heptane several times, dried in air, and then vacuum-dried in a desiccator for 6 hours to obtain the reactive polymer as a white powder.

(Preparation of Polycarbonate Urethane Prepolymer Terminated by Isocyanate Group)

While nitrogen gas was being introduced into a three-necked flask having a capacity of 300 mL and equipped with a reflux condenser, 18.5 g of a poly(hexamethylene carbonate) diol (Nippollan 980R, manufactured by Nippon Polyurethane Co., Ltd.) and 25.2 g of toluene were introduced into the flask and stirred to dissolve the diol. Thereafter, a solution prepared by mixing 4.98 g of poly(hexamethylene diisocyanate) (HDI; manufactured by Nippon Polyurethane Co., Ltd.) and 9.98 g of toluene was mixed with that solution. After the solutions were stirred and mixed evenly, the resultant mixture was heated to 60° C. and reacted for 15 hours. This mixture was cooled to room temperature, and 136.98 g of toluene was further added thereto to obtain a toluene solution of an isocyanate-terminated polycarbonate urethane prepolymer having a concentration of 12% by weight.

Example 1

Six grams of the reactive polymer obtained in Reference Example 4 was dissolved in toluene at room temperature to prepare 50 g of a reactive-polymer solution having a concentration of 12% by weight. This solution was mixed with 22.5 g of the toluene solution of an isocyanate-terminated polycarbonate urethane prepolymer having a concentration of 12% by weight obtained in Reference Example 4, and the resultant mixture was stirred. Furthermore, 145 g of toluene was added to the mixture solution obtained. Thus, a coating fluid having a solid concentration of 4% by weight was prepared.

This coating fluid was applied to one side of a polypropylene resin sheet with a spin coater and then dried at 50° C. for 1 hour to volatilize the toluene. Thus, a thin layer constituted of a mixture of the reactive polymer and the urethane prepolymer was formed on the polypropylene resin sheet.

This polypropylene resin sheet was superposed on the porous polyethylene resin film obtained in Reference Example 2, so that the thin layer constituted of a mixture of the reactive polymer and the urethane prepolymer was in contact with the porous film. The resultant stack was passed through the nip between laminating rolls heated at a temperature of 125° C. and was thereby heated and pressed to transfer the thin layer constituted of a mixture of the reactive polymer and the urethane prepolymer to one side of the porous polyethylene resin film.

Subsequently, the stack composed of the porous polyethylene resin film having the thin layer and the polypropylene resin sheet was heated at 90° C. for 48 hours to react the reactive polymer with the urethane prepolymer and crosslink the reactive polymer, thereby forming a crosslinked polymer having an insoluble content of 99%. Thereafter, the polypropylene resin sheet was peeled off to obtain a porous polyethylene resin film having the crosslinked polymer supported on one side thereof in an amount of 0.5 g/m².

The negative-electrode sheet obtained in Reference Example 1, the porous polyethylene resin film having the crosslinked polymer supported thereon, and the positive-electrode sheet obtained in Reference Example 1 were stacked in this order so that the crosslinked polymer on the porous film faced the positive-electrode sheet. Thus, an electrode/crosslinked-polymer-supporting porous polyethylene resin film stack was obtained. This stack was introduced into an aluminum laminate package, and an electrolyte solution constituted of an ethylene carbonate/diethyl carbonate (1/1 by weight) mixed solvent containing lithium hexafluorophosphate dissolved therein in a concentration of 1.4 mol/L was poured into the package, which was then sealed. Thereafter, the resultant battery was charged at a current of 0.2 CmA until the voltage reached 3.5 V, and was then placed in a 50° C. thermostatic chamber for 24 hours to accelerate adhesion between the electrode sheets and the porous polyethylene resin film.

Thus, a sealed laminate type battery was obtained.

With respect to the battery obtained, the results of the rate characteristics, continuous charge characteristics, and high-temperature storage test of the battery are shown in Table 1 together with the degree of areal shrinkage of the porous substrate, as in the case of Comparative Example 1.

Reference Example 5

(Preparation of Reactive Polymer)

Into a three-necked flask having a capacity of 500 mL and equipped with a reflux condenser were introduced 98 g of methyl methacrylate, 2.0 g of 4-hydroxybutyl acrylate, 25 g of ethyl acetate, and 0.20 g of N,N'-azobisisobutyronitrile. While nitrogen gas was being introduced, the contents were stirred and mixed for 30 minutes and then heated to 70° C. to initiate radical polymerization. At the time when about 2 hours had passed, an increase in the viscosity of the reaction mixture was observed. Thereafter, while ethyl acetate was being added, the temperature was kept almost constant and the polymerization was continued for further 8 hours.

After completion of the reaction, the reaction mixture obtained was cooled to 40° C., and ethyl acetate was added thereto. Thereafter, the contents were stirred and mixed until the mixture became wholly homogeneous. Thus, a reactive-polymer solution (concentration, 25% by weight) was obtained.

Subsequently, 100 g of the polymer solution was added to 600 mL of heptane with stirring with a high-speed mixer to precipitate the polymer. The polymer was taken out by filtration, repeatedly washed with heptane several times, dried in air, and then vacuum-dried in a desiccator for 6 hours to obtain the reactive polymer as a white powder.

(Preparation of Polycarbonate Urethane Prepolymer Terminated by Isocyanate Group)

While nitrogen gas was being introduced into a three-necked flask having a capacity of 300 mL and equipped with a reflux condenser, 20 g of a poly(hexamethylene carbonate) diol (the Nippollan 980R) and 20.94 g of ethyl acetate were introduced into the flask and stirred to dissolve the diol. Thereafter, 24.15 g of the same polyfunctional isocyanate as described above (hexamethylene diisocyanate/trimethylolpropane adduct; ethyl acetate solution; solid content, 25%; Coronate HL, manufactured by Nippon Polyurethane Co., Ltd.) was mixed with that solution. The resultant mixture was evenly stirred and then heated to 60° C. and reacted for 15 hours. The mixture was cooled to room temperature, and 151.88 g of ethyl acetate was further added thereto to obtain an ethyl acetate solution of an isocyanate-terminated polycarbonate urethane prepolymer having a concentration of 12% by weight.

Example 2

Six grams of the reactive polymer obtained in Reference Example 5 was dissolved in ethyl acetate at room temperature to prepare 50 g of a reactive-polymer solution having a concentration of 12% by weight. Thereto was added 16 g of the ethyl acetate solution of a urethane prepolymer having a concentration of 12% by weight obtained in Reference Example 5. This mixture was heated to 80° C. and reacted for 20 hours with stirring. Thereafter, the reaction mixture was cooled, and 132 g of ethyl acetate was added thereto to prepare a coating fluid having a solid concentration of 4% by weight.

This coating fluid was applied to one side of a polypropylene resin sheet with a spin coater and then dried at 50° C. for 5 minutes to volatilize the ethyl acetate. Thus, a thin layer constituted of a mixture of the reactive polymer and the urethane prepolymer was formed on the polypropylene resin sheet.

This polypropylene resin sheet was superposed on the porous polyethylene resin film obtained in Reference Example 2, so that the thin layer constituted of a mixture of the reactive polymer and the urethane prepolymer was in contact with the porous film. The resultant stack was passed through the nip between laminating rolls heated at a temperature of 125° C. and was thereby heated and pressed to transfer the thin layer constituted of a mixture of the reactive polymer and the urethane prepolymer to one side of the porous polyethylene resin film.

Subsequently, the stack composed of the porous polyethylene resin film having the thin layer and the polypropylene resin sheet was heated at 90° C. for 48 hours to react the reactive polymer with the urethane prepolymer and crosslink the reactive polymer, thereby forming a crosslinked polymer having an insoluble content of 98%. Thereafter, the polypropylene resin sheet was peeled off to obtain a porous polyethylene resin film having the crosslinked polymer supported on one side thereof in an amount of 0.5 g/m².

The negative-electrode sheet obtained in Reference Example 1, the porous polyethylene resin film having the crosslinked polymer supported thereon, and the positive-electrode sheet obtained in Reference Example 1 were stacked in this order so that the crosslinked polymer on the porous film faced the positive-electrode sheet. Thus, an electrode/crosslinked-polymer-supporting porous polyethylene resin film stack was obtained. This stack was introduced into an aluminum laminate package, and an electrolyte solution constituted of an ethylene carbonate/diethyl carbonate (1/1 by weight) mixed solvent containing lithium hexafluorophosphate dissolved therein in a concentration of 1.4 mol/L was poured into the package, which was then sealed. Thereafter, the resultant battery was charged at a current of 0.2 CmA until the voltage reached 3.5 V, and was then placed in a 50° C. thermostatic chamber for 24 hours to accelerate adhesion between the electrode sheets and the porous polyethylene resin film.

Thus, a sealed laminate type battery was obtained.

With respect to the battery obtained, the results of the rate characteristics, continuous charge characteristics, and high-temperature storage test of the battery are shown in Table 1 together with the degree of areal shrinkage of the porous substrate (porous polyethylene resin film), as in the case of Comparative Example 1.

Example 3

At room temperature, 6.0 g of the reactive polymer obtained in Reference Example 5 was dissolved in ethyl acetate to prepare 50 g of a reactive-polymer solution having a concentration of 12% by weight. Thereto was added 60 g of the ethyl acetate solution of a urethane prepolymer having a concentration of 12% by weight obtained in Reference Example 5. This mixture was heated to 80° C. and reacted for 20 hours with stirring. The resultant reaction mixture was cooled, and 220 g of ethyl acetate was added thereto to prepare a coating fluid having a solid concentration of 4% by weight.

This coating fluid was applied to one side of a polypropylene resin sheet with a spin coater and then dried at 50° C. for 5 minutes to volatilize the ethyl acetate. Thus, a thin layer constituted of the reactive polymer, the urethane prepolymer, and a product of reaction therebetween was formed on the polypropylene resin sheet.

This polypropylene resin sheet was superposed on the porous polyethylene resin film obtained in Reference Example 2, so that the thin layer was in contact with the porous film. The resultant stack was passed through the nip between laminating rolls heated at a temperature of 125° C. and was thereby heated and pressed to transfer the thin layer to one side of the porous polyethylene resin film.

Subsequently, the stack composed of the porous polyethylene resin film having the thin layer and the polypropylene resin sheet was heated at 90° C. for 48 hours to react the reactive polymer with the urethane prepolymer and crosslink the reactive polymer, thereby forming a crosslinked polymer having an insoluble content of 98%. Thereafter, the polypropylene resin sheet was peeled off to obtain a porous polyethylene resin film having the crosslinked polymer supported on one side thereof in an amount of 0.5 g/m$^2$.

The negative-electrode sheet obtained in Reference Example 1, the porous polyethylene resin film having the crosslinked polymer supported thereon, and the positive-electrode sheet obtained in Reference Example 1 were stacked in this order so that the crosslinked polymer on the porous film faced the positive-electrode sheet. Thus, an electrode/crosslinked-polymer-supporting porous polyethylene resin film stack was obtained. This stack was introduced into an aluminum laminate package, and an electrolyte solution constituted of an ethylene carbonate/diethyl carbonate (1/1 by weight) mixed solvent containing lithium hexafluorophosphate dissolved therein in a concentration of 1.4 mol/L was poured into the package, which was then sealed. Thereafter, the resultant battery was charged at a current of 0.2 CmA until the voltage reached 3.5 V, and was then placed in a 50° C. thermostatic chamber for 24 hours to accelerate adhesion between the electrode sheets and the porous polyethylene resin film.

Thus, a sealed laminate type battery was obtained.

With respect to the battery obtained, the results of the rate characteristics, continuous charge characteristics, and high-temperature storage test of the battery are shown in Table 1 together with the degree of areal shrinkage of the porous substrate (porous polyethylene resin film), as in the case of Comparative Example 1.

Reference Example 6

(Preparation of Reactive Polymer)

Into a three-necked flask having a capacity of 500 mL and equipped with a reflux condenser were introduced 98 g of methyl methacrylate, 2.0 g of 4-hydroxybutyl acrylate, 25 g of ethyl acetate, and 0.20 g of N,N'-azobisisobutyronitrile. While nitrogen gas was being introduced, the contents were stirred and mixed for 30 minutes and then heated to 70° C. to initiate radical polymerization. At the time when about 2 hours had passed, an increase in the viscosity of the reaction mixture was observed. Thereafter, while ethyl acetate was being added, the temperature was kept almost constant and the polymerization was continued for further 8 hours.

After completion of the reaction, the reaction mixture obtained was cooled to 40° C., and ethyl acetate was added thereto. Thereafter, the contents were stirred and mixed until the mixture became wholly homogeneous. Thus, a reactive-polymer solution (concentration, 25% by weight) was obtained.

Subsequently, 100 g of the polymer solution was added to 600 mL of heptane with stirring with a high-speed mixer to precipitate the polymer. The polymer was taken out by filtration, repeatedly washed with heptane several times, dried in air, and then vacuum-dried in a desiccator for 6 hours to obtain the reactive polymer as a white powder.

(Preparation of Polycarbonate Urethane Prepolymer Terminated by Isocyanate Group)

While nitrogen gas was being introduced into a three-necked flask having a capacity of 300 mL and equipped with a reflux condenser, 18 g of a poly(alkylene carbonate) diol having, in the molecule, alkylene chains differing in the number of carbon atoms (Duranol G3452, manufactured by Asahi Kasei Chemicals Corporation) and 41.68 g of toluene were introduced into the flask and stirred to dissolve the diol. Thereafter, 9.79 g of a polyfunctional isocyanate (Coronate 2770, manufactured by Nippon Polyurethane Co., Ltd.) was mixed with the solution. The resultant mixture was evenly stirred and mixed and was then heated to 60° C. and reacted for 15 hours. The mixture was cooled to room temperature, and 152.83 g of toluene was further added thereto to obtain a urethane prepolymer solution having a concentration of 12.5% by weight.

Example 4

Nine grams of the reactive polymer obtained in Reference Example 6 was dissolved in toluene at room temperature to prepare 90 g of a reactive-polymer solution having a concentration of 10% by weight. This solution was mixed with 32.4 g of the urethane prepolymer solution having a concentration of 12.5% by weight, and this mixture was stirred. Furthermore, 95.1 g of toluene was added to the resultant mixture solution to prepare a coating fluid having a solid concentration of 6% by weight.

This coating fluid was applied to one side of a polypropylene resin sheet with a spin coater and then dried at 50° C. for 5 minutes to volatilize the toluene. Thus, a thin layer constituted of a mixture of the reactive polymer and the urethane prepolymer was formed on the polypropylene resin sheet.

This polypropylene resin sheet was superposed on the porous polyethylene resin film obtained in Reference Example 2, so that the thin layer constituted of a mixture of the reactive polymer and the urethane prepolymer was in contact with the porous film. The resultant stack was passed through the nip between laminating rolls heated at a temperature of 125° C. and was thereby heated and pressed to transfer the thin layer constituted of a mixture of the reactive polymer and the urethane prepolymer to one side of the porous polyethylene resin film.

Subsequently, the stack composed of the porous polyethylene resin film having the thin layer and the polypropylene resin sheet was heated at 90° C. for 48 hours to react the reactive polymer with the urethane prepolymer and crosslink the reactive polymer, thereby forming a crosslinked polymer having an insoluble content of 98%. Thereafter, the polypropylene resin sheet was peeled off to obtain a porous polyethylene resin film having the crosslinked polymer supported on one side thereof in an amount of 0.5 g/m$^2$.

The negative-electrode sheet obtained in Reference Example 1, the porous polyethylene resin film having the crosslinked polymer supported thereon, and the positive-electrode sheet obtained in Reference Example 1 were stacked in this order so that the crosslinked polymer on the porous film faced the positive-electrode sheet. Thus, an electrode/crosslinked-polymer-supporting porous polyethylene resin film stack was obtained. This stack was introduced into an aluminum laminate package, and an electrolyte solution constituted of an ethylene carbonate/diethyl carbonate (1/1 by weight) mixed solvent containing lithium hexafluorophosphate dissolved therein in a concentration of 1.4 mol/L was poured into the package, which was then sealed. Thereafter, the resultant battery was charged at a current of 0.2 CmA until the voltage reached 3.5 V, and was then placed in a 50° C. thermostatic chamber for 24 hours to accelerate adhesion between the electrode sheets and the porous polyethylene resin film.

Thus, a sealed laminate type battery was obtained.

With respect to the battery obtained, the results of the rate characteristics, continuous charge characteristics, and high-temperature storage test of the battery are shown in Table 1 together with the degree of areal shrinkage of the porous substrate (porous polyethylene resin film), as in the case of Comparative Example 1.

Reference Example 7

(Preparation of Reactive Polymer)

Into a three-necked flask having a capacity of 500 mL and equipped with a reflux condenser were introduced 98 g of methyl methacrylate, 2.0 g of 4-hydroxybutyl acrylate, 25 g of ethyl acetate, and 0.20 g of N,N'-azobisisobutyronitrile. While nitrogen gas was being introduced, the contents were stirred and mixed for 30 minutes and then heated to 70° C. to initiate radical polymerization. At the time when about 2 hours had passed, an increase in the viscosity of the reaction mixture was observed. Thereafter, while ethyl acetate was being added, the temperature was kept almost constant and the polymerization was continued for further 8 hours.

After completion of the reaction, the reaction mixture obtained was cooled to 40° C., and ethyl acetate was added thereto. Thereafter, the contents were stirred and mixed until the mixture became wholly homogeneous. Thus, a reactive-polymer solution (concentration, 25% by weight) was obtained.

Subsequently, 100 g of the polymer solution was added to 600 mL of heptane with stirring with a high-speed mixer to precipitate the polymer. The polymer was taken out by filtration, repeatedly washed with heptane several times, dried in air, and then vacuum-dried in a desiccator for 6 hours to obtain the reactive polymer as a white powder.

(Preparation of Polycarbonate Urethane Prepolymer Terminated by Isocyanate Group)

While nitrogen gas was being introduced into a three-necked flask having a capacity of 300 mL and equipped with a reflux condenser, 18 g of a poly(alkylene carbonate) diol having, in the molecule, alkylene chains differing in the number of carbon atoms (Duranol G3452, manufactured by Asahi Kasei Chemicals Corporation) and 39.23 g of toluene were introduced into the flask and stirred to dissolve the diol. Thereafter, 8.16 g of a polyfunctional isocyanate (Coronate 2770, manufactured by Nippon Polyurethane Co., Ltd.) was mixed with the solution. The resultant mixture was evenly stirred and mixed and was then heated to 60° C. and reacted for 15 hours. The mixture was cooled to room temperature, and 143.86 g of toluene was further added thereto to obtain a urethane prepolymer solution having a concentration of 12.5% by weight.

Example 5

Six grams of the reactive polymer obtained in Reference Example 7 was dissolved in toluene at room temperature to prepare 60 g of a reactive-polymer solution having a concentration of 10% by weight. This solution was mixed with 48 g of the urethane prepolymer solution having a concentration of 12.5% by weight, and this mixture was stirred. Furthermore, 92 g of toluene was added to the resultant mixture solution to prepare a coating fluid having a solid concentration of 6% by weight.

This coating fluid was applied to one side of a polypropylene resin sheet with a spin coater and then dried at 50° C. for 5 minutes to volatilize the toluene. Thus, a thin layer constituted of a mixture of the reactive polymer and the urethane prepolymer was formed on the polypropylene resin sheet.

This polypropylene resin sheet was superposed on the porous polyethylene resin film obtained in Reference Example 2, so that the thin layer constituted of a mixture of the reactive polymer and the urethane prepolymer was in contact with the porous film. The resultant stack was passed through the nip between laminating rolls heated at a temperature of 125° C. and was thereby heated and pressed to transfer the thin layer constituted of a mixture of the reactive polymer and the urethane prepolymer to one side of the porous polyethylene resin film.

Subsequently, the stack composed of the porous polyethylene resin film having the thin layer and the polypropylene resin sheet was heated at 90° C. for 48 hours to react the reactive polymer with the urethane prepolymer and crosslink the reactive polymer, thereby forming a crosslinked polymer having an insoluble content of 98%. Thereafter, the polypropylene resin sheet was peeled off to obtain a porous polyethylene resin film having the crosslinked polymer supported on one side thereof in an amount of 0.5 g/m$^2$.

The negative-electrode sheet obtained in Reference Example 1, the porous polyethylene resin film having the crosslinked polymer supported thereon, and the positive-electrode sheet obtained in Reference Example 1 were stacked in this order so that the crosslinked polymer on the porous film faced the positive-electrode sheet. Thus, an electrode/crosslinked-polymer-supporting porous polyethylene resin film stack was obtained. This stack was introduced into an aluminum laminate package, and an electrolyte solution constituted of an ethylene carbonate/diethyl carbonate (1/1 by weight) mixed solvent containing lithium hexafluorophosphate dissolved therein in a concentration of 1.4 mol/L was poured into the package, which was then sealed. Thereafter, the resultant battery was charged at a current of 0.2 CmA until the voltage reached 3.5 V, and was then placed in a 50° C. thermostatic chamber for 24 hours to accelerate adhesion between the electrode sheets and the porous polyethylene resin film.

Thus, a sealed laminate type battery was obtained.

With respect to the battery obtained, the results of the rate characteristics, continuous charge characteristics, and high-temperature storage test of the battery are shown in Table 1 together with the degree of areal shrinkage of the porous substrate (porous polyethylene resin film), as in the case of Comparative Example 1.

Referential Example 1

A porous polytetrafluoroethylene resin film having a porosity of 97% and a thickness of 5 μm was superposed on and supported on one side of the porous polyethylene resin film obtained in Reference Example 2.

The negative-electrode sheet obtained in Reference Example 1, the porous polyethylene resin film having the porous polytetrafluoroethylene resin film supported thereon, and the positive-electrode sheet obtained in Reference Example 1 were stacked in this order so that the porous fluororesin film on the porous polyethylene resin film faced the positive-electrode sheet. Thus, an electrode/porous-fluororesin-film-supporting porous polyethylene resin film stack was obtained. This stack was introduced into an aluminum laminate package, and an electrolyte solution constituted of an ethylene carbonate/diethyl carbonate (1/1 by weight) mixed solvent containing lithium hexafluorophosphate dissolved therein in a concentration of 1.4 mol/L was poured into the package, which was then sealed. Thereafter, the resultant battery was charged at a current of 0.20 CmA until the voltage reached 3.5 V. Thus, a sealed laminate type battery was obtained.

The battery thus obtained was evaluated for continuous charge characteristics and high-temperature storability in the same manners as in Comparative Example 1. As apparent from the results given in Table 1, no increase in current value was observed in the continuous charge. The battery after the high-temperature storage had a voltage of 4.1 V.

TABLE 1

|  | Insoluble content (%) | Rate characteristics (%) | Continuous charge characteristics (h) | High-temperature storability (V) | Degree of areal shrinkage (%) |
| --- | --- | --- | --- | --- | --- |
| Comparative Example 1 | — | 88 | 65 | 3.78 | 73 |
| Comparative Example 2 | — | 80 | 70 | 3.95 | 6 |
| Example 1 | 99 | 85 | no increase | 4.09 | 13 |
| Example 2 | 98 | 79 | no increase | 4.10 | 9 |
| Example 3 | 98 | 83 | no increase | 4.11 | 12 |
| Example 4 | 98 | 76 | no increase | 4.10 | 8 |
| Example 5 | 98 | 81 | no increase | 4.11 | 8 |
| Referential Example 1 | — | — | no increase | 4.10 | — |

As apparent from the results given in Table 1, the results of Examples 1 to 5 are substantially equal to the results of Referential Example 1, in which a porous fluororesin film was interposed between the positive-electrode sheet and the porous polyethylene resin film. Namely, the crosslinked polymer in the invention has oxidation resistance which is substantially equal to that of the porous fluororesin film used in Referential Example 1.

As demonstrated above, in the battery according to the invention, the crosslinked polymer having a polycarbonate urethane framework and interposed between the positive electrode and the separator does not oxidatively deteriorate despite the high oxidation reactivity of the positive electrode. Consequently, the battery suffers neither deterioration of the electrode/separator adhesion nor the deterioration of battery characteristics caused by products of decomposition of the crosslinked polymer. In addition, the crosslinked polymer functions also as a protective layer for the separator. Consequently, even when the porous polyolefin resin film is used as separators, these separators can be prevented from oxidatively deteriorating.

While the invention has been described in detail and with reference to specific embodiments thereof, it will be apparent to one skilled in the art that various changes and modifications can be made therein without departing from the spirit and scope thereof.

This application is based on a Japanese patent application No. 2008-094392 filed on Mar. 31, 2008, the entire contents thereof being herein incorporated by reference.

Further, all references cited herein are incorporated by reference in their entirety.

Industrial Applicability

According to the invention, a battery separator having excellent oxidation resistance and having the property of adhering to an electrode is obtained by supporting on a porous substrate a layer of a crosslinked polymer obtained by reacting a reactive polymer having in the molecule thereof a reactive group containing active hydrogen with a polycarbonate urethane prepolymer terminated by an isocyanate group. Furthermore, a battery using such a battery separator is provided according to the invention.

The invention claimed is:

1. A battery separator comprising:
   a porous substrate; and
   a layer of a crosslinked polymer supported on at least one surface of the porous substrate, wherein the crosslinked polymer is obtained by reacting
   (a) a reactive polymer having a reactive group containing a hydroxy group with
   (b) a polycarbonate urethane prepolymer in which two ends thereof are terminated by an isocyanate group,
   the polycarbonate urethane prepolymer is obtained by reacting an aliphatic polycarbonate diol having hydroxy groups with a polyfunctional isocyanate having isocyanate groups, wherein a molar ratio of the isocyanate groups possessed by the polyfunctional isocyanate to the hydroxy groups possessed by the polycarbonate diol is in a range of 1.2 to 3.3.

2. The battery separator according to claim 1, wherein the porous substrate is a porous polyolefin resin film.

3. The battery separator according to claim 2, wherein the porous polyolefin resin film is a porous polyethylene resin film.

4. An electrode/separator laminate comprising:
   the separator according to claim 1; and
   a positive electrode and a negative electrode laminated together with the separator interposed therebetween,
   wherein at least one of the positive electrode and the negative electrode is adhered to the porous substrate by the crosslinked polymer.

5. A battery comprising the electrode/separator laminate according to claim 4.

6. The battery according to claim 5, wherein the battery further comprises a nonaqueous electrolyte solution and the layer of the crosslinked polymer faces at least the positive electrode.

7. A process for producing a battery, said process comprising:
- stacking a positive electrode and a negative electrode together with the separator according to claim 1 interposed therebetween;
- introducing the resultant stack into a battery container, followed by pouring a nonaqueous electrolyte solution into the battery container; and
- forming an electrode/separator laminate in which at least one of the positive electrode and the negative electrode is adhered to the porous substrate by the crosslinked polymer.

8. The process for producing a battery according to claim 7, wherein the positive electrode and the negative electrode are stacked together with the separator interposed therebetween so that the layer of the crosslinked polymer faces at least the positive electrode.

* * * * *